July 5, 1960
E. CRONHOLM
2,943,544
ROTATABLE DETACHABLE PHOTOMETER ON CAMERA
Filed Feb. 14, 1957
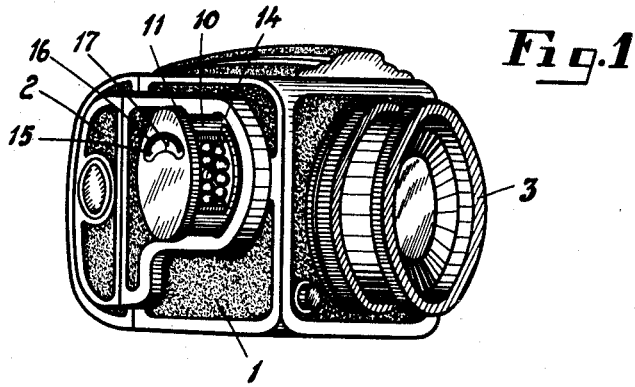
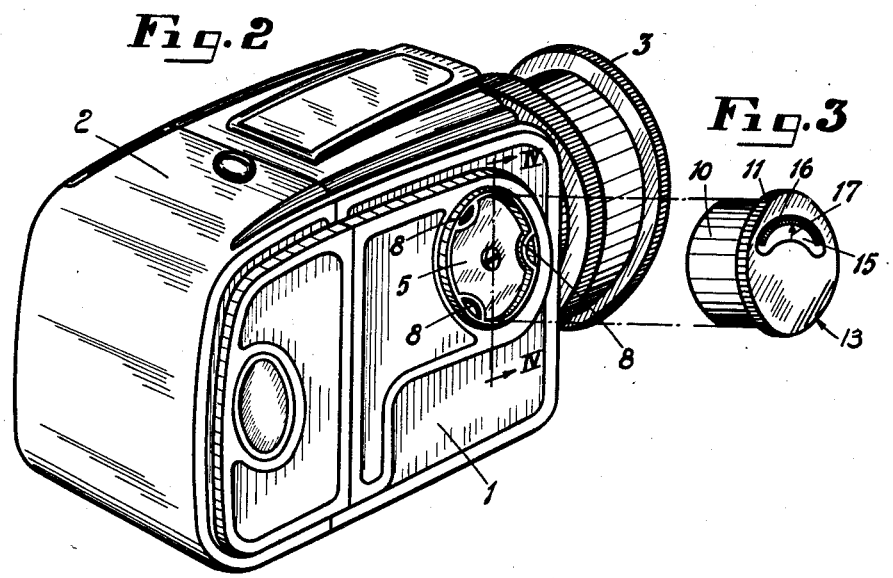
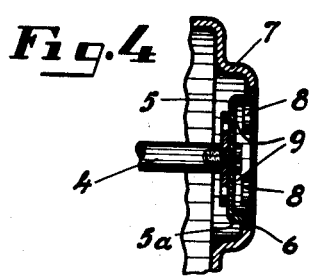
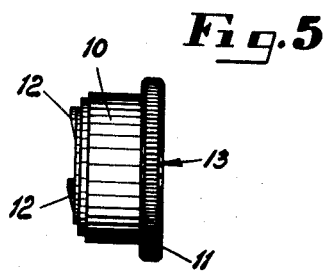
INVENTOR
*EINAR CRONHOLM*
BY *Linton and Linton*
ATTORNEYS

United States Patent Office 2,943,544
Patented July 5, 1960

2,943,544

ROTATABLE DETACHABLE PHOTOMETER ON CAMERA

Einar Cronholm, Goteborg, Sweden, assignor to Fritz Victor Hasselblad, Goteborg, Sweden Filed Feb. 14, 1957, Ser. No. 640,267

Claims priority, application Sweden Feb. 18, 1956

3 Claims. (Cl. 95—10)

The present invention relates to mirror reflex cameras for roll film. More particularly, the invention relates to cameras of this type provided with a photometer in the form of a unit independent of the shutter and diaphragm means, and which are further provided with a rotatable knob arranged to set the shutter, feed the film and swing the mirror down to reflecting position, when rotated from an initial position to a terminal position.

In hitherto known cameras of the type in question, the photometer is permanently secured to or built into the camera, so that it may only be used together with the camera, for instance for incidence measuring.

This invention, the object of which is to overcome this drawback, is essentially characterized in that the photometer is disposed in the knob with its light opening arranged in the periphery of the knob in such a position, that in the terminal operated position of the knob, the light opening of the photometer faces in the same direction as the objective of the camera, and that the knob is detachably connected to an attached member which is rotatably arranged in the camera casing and transmits the rotating movement of the knob to the camera shutter and other operating mechanisms, so that after detaching the knob from said attaching member, the knob may also be used as a photometer independently of the camera.

The knob may be provided, at its free end surface, with a window behind which is arranged the pointer of the photometer.

The removable connection between the knob and the attaching means may consist of a bayonet joint which is preferably arranged in such a way, that the knob may be put into engagement with the attaching means only in a certain angle of rotation of the knob relative to the attachment.

One embodiment of the present invention is illustrated in the accompanying drawing in which:

Figure 1 is a perspective view of a mirror reflex camera provided with a combined photometer and camera setting knob ready for exposure, Figure 2 is a similar view of the camera with the knob removed, Figure 3 is a perspective view of the combined knob and photometer detached from the camera, Figure 4 is on a larger scale a section along the line IV—IV in Figure 2 through the attaching means for the combined knob and photometer, and Figure 5 is a side view of the combined knob and photometer.

In the drawing, numeral 1 designates the camera casing to which there is attached a removable film container 2 and an objective holder 3. In Figure 4, numeral 4 designates a shaft which is rotatably journalled in the casing 1 and by which is arranged, in a manner known per se, to set the spring (not shown) of the camera shutter, actuate a mechanism for feeding the film, and swing the mirror (not shown) down to reflecting position by means of intermediary mechanisms (not shown) when rotated around its axis from an initial position to a terminal position.

To one end of the shaft 4 there is attached a cup-shaped plate 5 which is positioned in a bulge 7 of one side wall of the camera casing, said bulge being provided with an opening 6. From the inner side of the substantially cylinder-shaped wall 5a of the cup plate 5 there extend inwardly three arcuate projections or studs 8 which are spaced from each other by different angular distances. Between each of the projections 8 and the bottom of the cup-shaped plate 5 there is a free space 9.

The knob 13 shown in Figures 3 and 5 serves for rotating the shaft 4 and is formed with a cylindrical portion 10 and a radial end flange 11 having a serrated or knurled periphery. The knob 13 is provided, at the end opposite the end flange 11, with three projections 12 which are spaced from each other by angular distances corresponding to the distances between the projections 8 of the cup plate 5 and so disposed, that said opposite end of the knob 13, in a certain angle of rotation of the knob relative to the plate 5, may be moved axially down into the cup-shaped plate 5, whereafter, by rotating the knob 13 so that the projections 12 respectively extend into the spaces 9, the projections 12 may be put into bayonet clutch engagement with the projections 8 of the cup plate 5.

The knob 13 which is equipped with conventional photometer means is provided with a light opening 14 disposed at the side of the cylindrical portion 10 in such a position, that after rotating the knob for actuating the shutter spring, film feeding means and the mirror of the camera, said light opening is facing in the same direction as the camera objective. In the free end surface of the knob there is provided a window 15 behind which is arranged the pointer 17 indicating the light value on a graduation 16.

After its removal from the camera which may for instance be mounted on a tripod, the knob may be used independently of the camera for incidence measuring.

Besides the combined photometer and knob, the equipment of the camera may also comprise a common knob or crank handle or a mechanism for automatically rotating the shaft 4 by means of a spring drive or electric motor, which knob, handle or mechanism may be detachably connected to the plate 5.

The present invention is not limited to the embodiment hereinbefore described and shown in the accompanying drawing, said embodiment being susceptible of various modifications with respect to its details within the scope of the appended claims.

What I claim is:

1. In a camera assembly having an objective lens and a spring driven shutter for said lens, a photometer assembly comprising a shaft for setting said shutter spring, a photometer knob, means for lockingly engaging said knob to said shaft, said photometer knob including photometer measuring and indicating elements and a knob light opening for said elements arranged for being positioned in the same direction as said lens upon the rotation of said shaft to its spring setting position.

2. An assembly according to claim 1, said interlocking means comprising a terminal cup carried on said shaft and having arcuate studs defining recesses, and projecting fingers carried on said knob and lockingly engageable in said recesses.

3. An assembly according to claim 1, said interlocking means comprising a terminal cup carried on said shaft and having arcuate studs defining recesses, and projecting fingers carried on said knob and lockingly engageable in said recesses, said cup and said projecting fingers providing a bayonet joint mutually lockingly engageable in one angular position of said knob with reference to said cup.

References Cited in the file of this patent

UNITED STATES PATENTS

| | | |
|---|---|---|
| 2,307,748 | Philips | Jan. 12, 1943 |
| 2,596,328 | Dorsey | May 13, 1952 |
| 2,629,301 | Knauf | Feb. 24, 1953 |
| 2,679,790 | Clark | June 1, 1954 |
| 2,765,763 | Bretthauer | Oct. 9, 1956 |
| 2,773,437 | Knauf | Dec. 11, 1956 |

FOREIGN PATENTS

| | | |
|---|---|---|
| 502,908 | Great Britain | Mar. 28, 1939 |
| 886,894 | France | July 19, 1943 |